US005689263A

United States Patent [19]

Dames

[11] Patent Number: 5,689,263

[45] Date of Patent: Nov. 18, 1997

[54] ANTIPILFERAGE MARKERS

[75] Inventor: Andrew Dames, Milton, Great Britain

[73] Assignee: Esselte Meto International GmbH, Heppenheim, Germany

[21] Appl. No.: 178,571

[22] Filed: Jan. 7, 1994

Related U.S. Application Data

[63] Continuation-in-part of PCT/GB92/01250, Jul. 9, 1992.

[30] Foreign Application Priority Data

Jul. 9, 1991 [GB] United Kingdom .................. 9114793

[51] Int. Cl.[6] .......................... G01S 13/08; G08B 13/14; B32B 31/00; B05D 5/12

[52] U.S. Cl. .......................... 342/51; 340/572; 156/268; 156/52; 427/96

[58] Field of Search .............................. 342/51; 340/572; 156/268, 52; 427/96

[56] References Cited

U.S. PATENT DOCUMENTS

| | | | |
|---|---|---|---|
| 3,810,147 | 5/1974 | Lichtblau . | |
| 3,863,244 | 1/1975 | Lichtblau . | |
| 3,967,161 | 6/1976 | Lichtblau . | |
| 4,021,705 | 5/1977 | Lichtblau . | |
| 4,498,076 | 2/1985 | Lichtblau . | |
| 4,835,524 | 5/1989 | Lamond et al. . | |
| 4,910,499 | 3/1990 | Benge et al. . | |
| 5,006,856 | 4/1991 | Benge et al. | 340/572 |
| 5,059,950 | 10/1991 | Perchak | 340/572 |
| 5,494,550 | 2/1996 | Benge | 156/268 |

*Primary Examiner*—Mark Hellner

*Attorney, Agent, or Firm*—Nils H. Ljungman and Associates

[57] ABSTRACT

An antipilferage tag is disclosed which includes a resonant circuit adapted to receive an RF signal and to transmit a response signal when interrogated by said RF signal. The tag includes circuit components constituted by or fabricated from a metallized layer supported by a dielectric material.

24 Claims, 3 Drawing Sheets

ANTIPILFERAGE MARKERS

CONTINUING APPLICATION DATA

This application is a Continuation-In-Part application of international Application No. PCT/GB92/01250, filed on Jul. 9, 1992, which claims priority from British Patent Application No. 91 14 793.4, filed on Jul. 9, 1991. International Application No. PCT/GB92/01250 was pending as of the filing date of U.S. application Ser. No. 08/178,571 and the U.S. was an elected state in International Application No. PCT/GB92/01250.

INTRODUCTION

This invention relates to antipilferage markers of the type traditionally referred to as radiofrequency (RF) tags. These tags typically use a capacitor-inductor combination to provide a circuit having a characteristic electromagnetic resonance which, in use, receives an RF signal in an interrogation zone and, in response thereto, transmits a signal, e.g. to a receiver in order to generate an alarm indication. This invention is particularly concerned with a novel means for fabricating the tag circuit.

1. Prior Art

The general operation and certain methods of assembly of such RF tags are disclosed in patents such as those of Lichtblau (U.S. Pat. Nos. 3,810,247, 3,863,244, 3,967,161, 4,021,705). In order to construct the appropriate circuit elements, two or more layers of metal are required. In the prior art this has been achieved by the exclusive use of metal foils of substantial thickness (typically several microns or several tens of microns) which are normally manufactured by rolling techniques. The foils are usually cut, slit, or etched into complex shapes, and are often folded to form the two layers. For example, U.S. Pat. No. 4,910,499 (S. Eugene Benge, assigned to Monarch Marking Systems, Inc.) discloses a deactivatable tag useable with an electronic article surveillance system and which comprises a pair of spiral conductive elements which are mutually inverse in their orientation. The spirals are formed by a cutting process. The disadvantages of the prior art processes are in the amount of metal required, and in the complex patterns and alignments which are needed in manufacture.

2. Brief Description of the Invention

According to one aspect of the present invention, there is provided a tag which includes a resonant circuit adapted to receive an RF signal and to transmit a response signal when interrogated by said RF signal, characterised in that at least a part of the tag is constituted by, or is formed from, a precursor comprising a polymer dielectric having a thin, metallised coating less than 1 micron thick on one surface thereof. Advantageously, the precursor comprises a polymer dielectric carrying the thin, metallised coating on one surface thereof and a bulk metal layer on the opposite surface thereof.

According to a second aspect, the present invention provides an antipilferage tag which includes a resonant circuit adapted to receive an RF signal and to transmit a response signal when interrogated by said RF signal, characterised in that the tag includes circuit components constituted by or fabricated from a metallised layer less than 1 micron thick supported by a dielectric material.

Typically, the present invention enables one or more layers of metallisation to be used to replace one or more of the normal metal layers. The use of a metallised layer as part of the RF tag circuit gives many potential advantages over the prior art. For example, it may permit lower-cost construction, involving fewer laminated layers; it may permit the easier formation of a fusible link for tag deactivation; it may allow the production of a more flexible label for application to goods; and it may permit a number of manufacturing simplifications which (for example) may reduce the amount of dissolved metal and hence the quantity of chemicals used if an etching process is being employed.

DETAILED DESCRIPTION OF THE INVENTION

Figure 1:
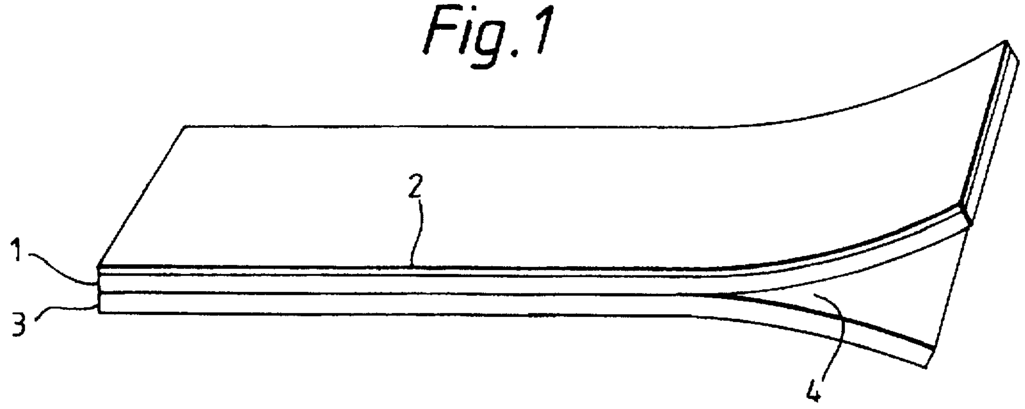

The metallised layer used in this invention may be formed by a number of conventional methods. They include evaporation, sputtering, chemical or vapour deposition, and electroplating. The material metallised may be any suitable metal, but copper and (more preferably) aluminium have optimal properties. The metallisation will be typically less than 1 micron thick; in the preferred embodiment it is as thin as 0.1 micron.

Additional features that can be incorporated into the tag of the present invention include the breaking up of the area of the capacitor electrodes (especially on the side of the tag where thick metal is used, i.e. on the coil side of the tag) to reduce losses from eddy currents. Appropriate features to accomplish this effect are illustrated by FIG. 2, and may be incorporated into the mask pattern if the tag is formed by etching.

The use of a two-capacitor circuit (for example 4 and 7 as shown in FIG. 2, and described in greater detail hereinafter) to avoid a metallic through-connection between the two metal layers of the tag is particularly preferred, as it is difficult to form reliable connections to the metallised layer in the conventional stamping process. The two capacitors need not be of equal area; a more efficient use of area results if the outer capacitor is smaller than the inner one, as this gives a larger effective area for the coil on a given sized tag. To avoid any contribution to resonant frequency uncertainty from small misalignments in the upper and lower metal patterns, the capacitor plates are advantageously slightly smaller on one side of the tag than the other, such that the overlapping area does not vary for small displacements.

Tags which are to be used in electronic article surveillance systems need to have the capacity to be deactivated, so that their signal generating function can be disabled by authorised personnel, e.g. at a goods check-out station. The deactivation process preferably employed in tags of the present invention is to cause a narrow region of the metallised film to go into open circuit under a sufficiently high level of RF field swept through the resonant frequency. This can be achieved by conventional means. The use of the metallised layer as the deactivating means a represents novel variation on the prior art technique of fusing part of the coil, and permits low cross section structures that blow under reasonable field levels to be easily defined. Accordingly, in another aspect, the present invention provides an antipilferage tag which includes a resonant circuit adapted to receive an RF signal and to transmit a response signal when interrogated by said RF signal, characterised in that the tag includes deactivating means in the form of a circuit component constituted by or fabricated from a metallised layer less than 1 micron thick supported by a dielectric material.

The deactivation field can be reduced if a narrower neck is formed in the metallisation pattern, but any large improvement would be at the expense of increased resistive losses and hence reduced Q. Thicker metallisation may be deposited in areas other than the fusing zone to reduce the overall resistivity; this may be achieved, for example, by electrodeposition, a further evaporation process, or electroless plating.

Lower field deactivation can be promoted without increasing resistive losses by keeping the fusible area under mechanical stress, in a similar way to that in which fast blow fuses incorporate a spring. This provides more consistent fusing at lower field strengths. This can be incorporated at manufacture by embossing the area surrounding the fusible link. This is significantly different from the technique disclosed in U.S. Pat. No. 4,498,076 (Lichtblau, 1985), which refers to mechanically enhanced short circuiting of the tag capacitor rather than open circuiting of a fuse. Alternatively the stress can be introduced by heating areas of the tag around the fuse during manufacture.

Other deactivation techniques, such as voltage induced dielectric breakdown between the two metal surfaces, or between different parts of the coil, may also be used if desired.

The use of a metallised layer as part of the RF tag circuit gives many potential advantages compared with the prior art of using bulk metal, e.g. aluminium, on both sides; for example it may permit lower cost at construction, fewer laminated layers, easy formation of a fusible link for deactivation, less dissolved metal if the coil is etched, less chemical usage and less waste.

In a further aspect, the invention provides a method of fabricating an antipilferage tag, which method comprises:

(a) bonding a metal layer to one surface of a laminar dielectric material;

(b) depositing a thin, metallised coating onto the opposite surface of said dielectric material; and (c) generating circuit components from said metal layer and from said thin, metallised coating;

characterised in that said thin, metallised coating is less than 1 micron thick.

Figure 2A:
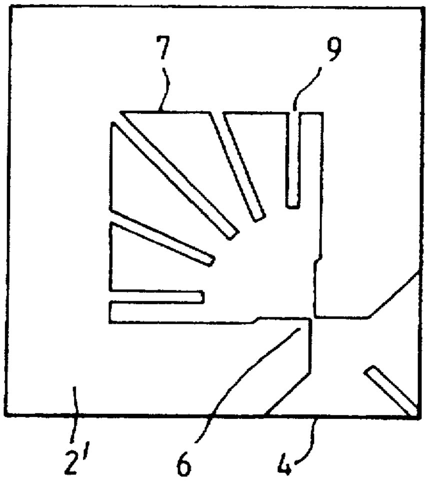
Figure 2B:
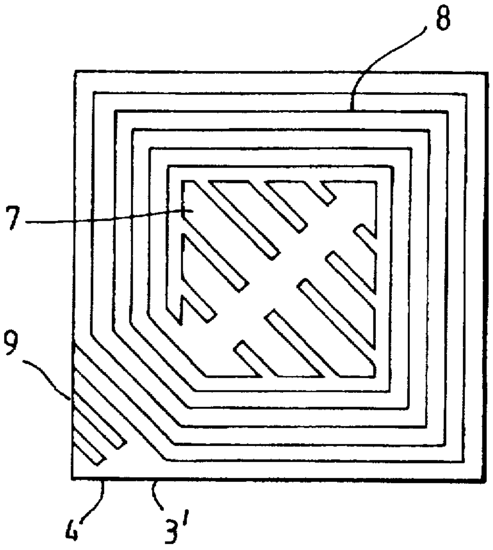
Figure 2C:
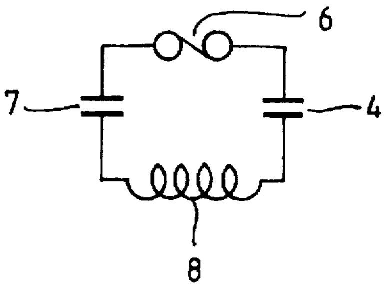
Figure 3A:
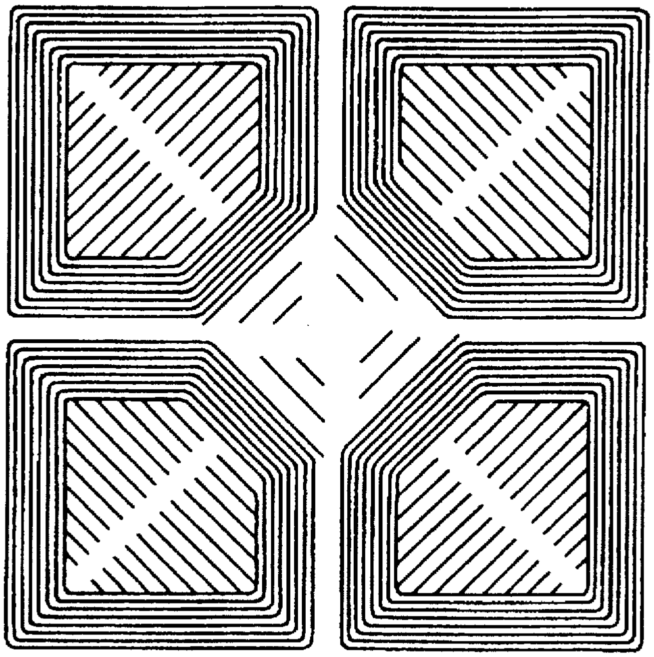
Figure 3B:
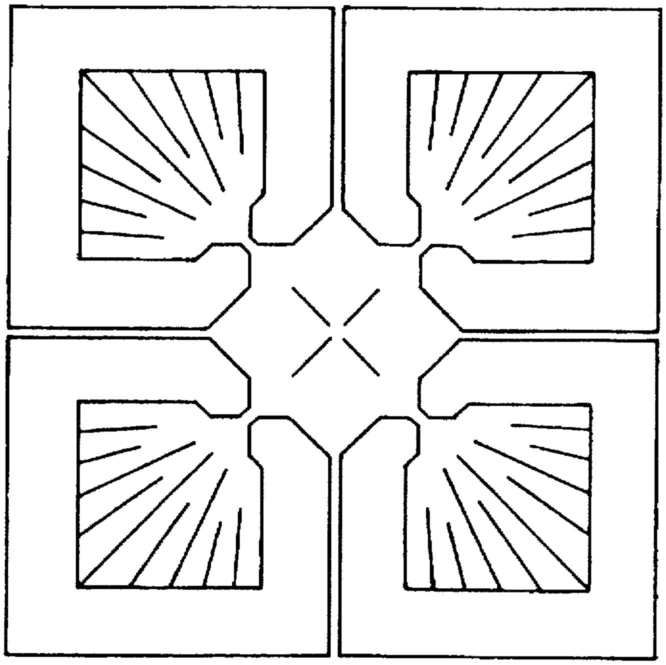

The invention will now be illustrated, by way of example, with reference to the accompanying drawings, in which:

FIG. 1 shows the starting materials for tag production before the circuit has been formed;

FIGS. 2*a*–2*c* show suitable conductive patterns of metallisation (FIG. 2*a* being those on one side of the tag, while FIG. 2*b* being those on the opposite side of the tag) and an equivalent circuit diagram (FIG. 2*c*);

FIGS. 3*a* and 3*b* are examples of mask etch patterns; and

FIGS. 4*a*, 4*b*, 5*a*, 5*b*, 5*c* and 5*d* illustrate an alternative tag construction in accordance with this invention.

Referring now to FIG. 1, a polymer dielectric 1, typically 8 to 20 microns thick, and typically a polyester or polypropylene, carries a metallisation layer 2, typically aluminium 0.1 micron thick. The opposite side of polymer dielectric 1 carries a bulk conductor layer 3, typically a 20 micron layer of aluminium. Lamination of the bulk metal 3 to the polymer 1 is shown at 4; this may be either by an adhesive layer (typically 2 microns thick), or by direct hot nip or extrusion of the polymer 1 onto the bulk metal foil 3.

Referring next to FIG. 2, an etched pattern 2' is shown on the metallised side of the tag (left hand portion of the Figure), and an etched pattern 3' is shown on the opposite (bulk metal) side of the tag (right hand portion of the Figure). The tag (also commonly termed a label) is typically 40 mm square. The area 4 constitutes an external capacitor, and a fusible link 6 is defined by an etched pattern (as shown) on the metallised side of the tag. The fusible link 6 connects the external capacitor 4 with the areas 7, which constitute an internal capacitor. The metallised areas 8 constitute a coil. This preferably has eight turns, each preferably 0.8 mm wide on 1 mm in pitch. Slits 9 are present in the positions indicated in order to reduce eddy current losses in the capacitor plates, which are typically 0.2 mm thick. Note that the slits of opposing capacitor plates cross approximately at right angles in this embodiment, minimising capacitance errors from any misregistration of etch patterns.

The presently preferred route for manufacturing the RF tags of this invention is based on well established material processing techniques using readily available starting materials. The following Examples illustrate these techniques:

EXAMPLE 1

This Example illustrates the production of a tag having a metallised pattern generally as shown in FIG. 2. The preferred starting material is a composite web of aluminium foil laminated to metallised polypropylene (as shown in FIG. 1). This gives a lower loss polymer dielectric layer twenty microns thick, with twenty microns of aluminium on the bulk metal side, and 0.05 microns of aluminium on the other (metallised) side.

Processing

The web is simultaneously printed on both sides with the required etch resist patterns in a gravure cylinder printing process. Registration holes are inserted into the edges of the web at this stage to provide proper location of the film at the label stamping stage (see below). The resist is then dried and the web fed through the acid based etchant bath to generate the desired metallisation patterns. The completed circuit is then neutralised and dried; the etch resist may not have to be removed.

Label conversion

This requires the addition of a paper top layer on one side of the circuit, and pressure sensitive adhesive and release paper on the other, before the labels are stamped out making use of the registration holes put into the circuit at the resist printing stage.

VARIATIONS ON MANUFACTURING ROUTE

Starting Material

Use of polyester as the polymer layer: this has higher dielectric loss than polypropylene, but has the advantage that aluminium/polyester laminate is readily available.

Bonding of the Aluminium and Polymer

Use of glue bonding, or direct hot nip of the polymer to the aluminium, is possible. The major concern with both techniques is to produce a consistent and uniform dielectric thickness with good bonding between the layers. If a glue layer is used its thickness should be minimised (one micron ideally), as it represents a higher loss portion of the dielectric.

Processing

The present invention permits the following features to be incorporated into the processing or tag fabrication steps:

A. Optimisation of the basic etching process to minimise cost;

B. Reduction of the amount of material removed; Leaving resist in place at end of process;

C. Printing and etching of both sides of the tag simultaneously;

D. Shot blasting of the aluminium laminate using a rubber compound resist printed onto the foil to define the coil pattern. This technique could also be used to etch the pattern on the metallised side of the plastic; alternatively this pattern could be formed at the evaporation stage using a suitable mask, and then Just the coil pattern shot blasted.

E. Connecting the two aluminium layers together by stamping through the plastic at the outside end of the coil. This saves having capacitor plates at both ends of the coil, but may cause problems if used to connect to an extremely thin evaporated layer of metallised aluminium.

Label Forming

F. The choice of label top surface can be wide, as the active portion of the tag is thin, and hence of low stiffness. The stiffness is also lowered by the etching of the bulk aluminium in order to generate a coil. This should allow for Roboskin, thermal and conventional paper to be used.

G. Manufacture of traditional shaped edged labels with adjacent rows of labels overlapping minimising waste—the tag etch patterns have to be created in this way to start with.

EXAMPLE 2

Figure 4A:
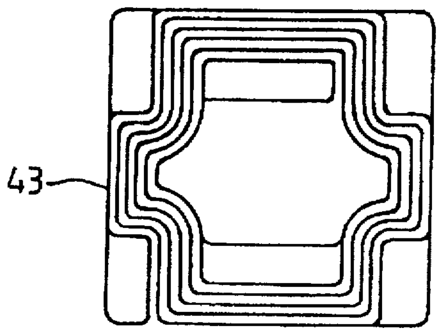
Figure 4B:
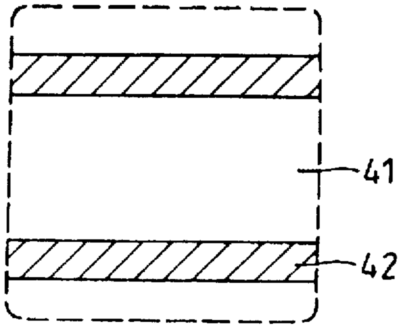
Figure 5A:
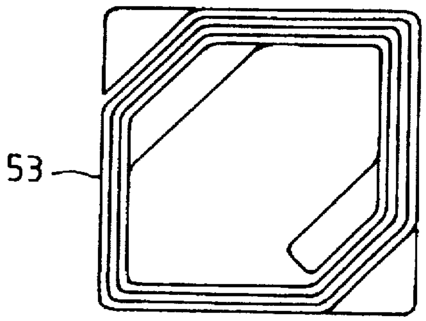
Figure 5B:
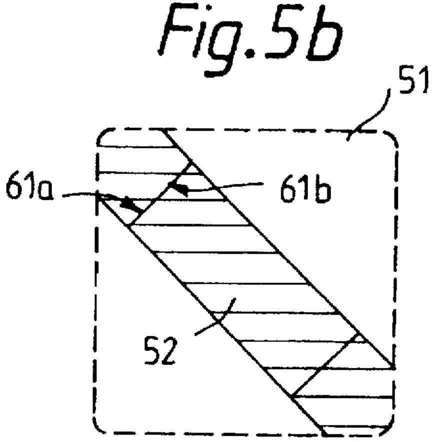
Figure 5C:
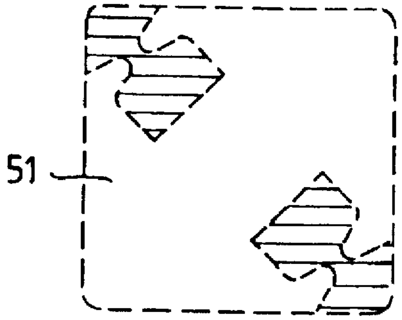
Figure 5D:
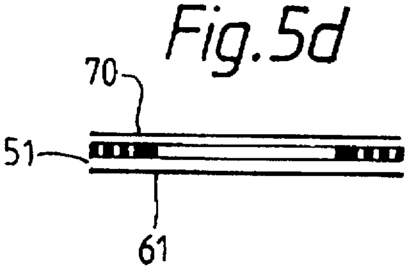

A different label structure in accordance with this invention has also been produced, where aluminium/polyester laminate is etched into coils, and subsequently laminated to a polypropylene layer which has previously been metallised in strips. This forms a coil capacitor circuit with the polypropylene as the dielectric, and the metallised strips forming the capacitors and current return path. This structure is illustrated in FIGS. 4*a*, 4*b*, 5*a*, 5*b*, 5*c* and 5*d* of the drawings. FIGS. 4*a* and 5*a* show the 'coil' side of the tag, while FIGS. 4*b* and 5*b* show the strip capacitors on the opposite side of the tag. The arrangements of FIGS. 4*a* and 4*b* and 5*a*–5*d* differ in their geometries, as shown. In FIG. 4*b*, the polypropylene dielectric 41 is eight microns thick and carries strips of metallised aluminium coating 42 which (in this embodiment) are 6 mm wide. The resistivity is 0.5 ohms/square mm. In FIG. 5*b*, a similar polypropylene dielectric carries a diagonally disposed strip 52 of metallised aluminium coating which incorporates laser cuts 61*a*, 61*b* etc. which constitute a fusible link between portions of the metallised strip; when subjected to a high RF field swept through the resonant frequency of the circuit, these links fuse, thereby deactivating the tag. An alternative construction is shown in FIG. 5*c*, where different geometries of fusible metallised areas are depicted. The overall lamination is illustrated in FIG. 5*d*, where a top layer 70 approximately 40 microns thick is secured over the aluminium coil 53, which is approximately 25 microns thick; this is over the polypropylene dielectric layer 51 (eight microns thick); and the metallised, strip-form zones 61 are carried by layer 51. The metallised strips 61 are approximately 70 nm thick.

The mode of implementation illustrated in FIGS. 4*a* and 4*b* and 5*a*–5*d* has the advantage that the polymer layer can be obtained metallised in stripes at low cost, and needs no further processing after it has been laminated to the coil.

Referring back to FIG. 2*a*, the deactivation field can preferably be reduced if a narrower neck is formed in the metallization pattern, preferably shown by 6, as discussed previously. Preferably by stretching or stressing the area around the fusible area 6, lower field deactivation can preferably be achieved. The stretching or stressing of the area around fusible area 6 may be achieved by embossing. When deactivation occurs by sweeping a sufficiently high level of RF field through the resonant frequency, the area adjacent the fusible link 6 preferably melts and deactivates the tag.

One feature of the invention resides broadly in the tag for use in electronic article surveillance systems, which tag includes a resonant circuit adapted to receive an RF signal and to transmit a response signal when interrogated by the RF signal, characterized in that at least a part of the tag is constituted by, or is formed from, a precursor comprising a polymer dielectric having a thin metallized coating less than 1 micron thick on one surface thereof.

Another feature of the invention resides broadly in the antipilferage tag which includes a resonant circuit adapted to receive an RF signal and to transmit a response signal when interrogated by said RF signal, characterized in that the tag includes circuit components constituted by or fabricated from a metallized layer less than 1 micron thick supported by a dielectric material.

Still another feature of the invention resides broadly in the tag, characterized in that the precursor comprises a polymer dielectric having a thin, metallized coating less than 1 micron thick on one surface thereof and bulk metallic layer on the opposite surface thereof.

Yet still another feature of the invention resides broadly in the tag, characterized in that the thin, metallized coating is formed by evaporation, sputtering, chemical or vapor deposition, or electroplating.

Still another feature of the invention resides broadly in the tag, characterized in that the material which constitutes the thin, metallized coating is copper or aluminum.

Yet still another feature of the invention resides broadly in the tag, characterized in that the thin, metallized coating is 0.1 micron in thickness.

Still another feature of the invention resides broadly in the tag, characterized in that it includes a two-capacitor circuit.

Yet still another feature of the invention resides broadly in the tag, characterized in that there is an outer capacitor and an inner Capacitor.

Still another feature of the invention resides broadly in the tag, characterized in that the outer capacitor is smaller than the inner one.

Yet still another feature of the invention resides broadly in the tag, characterized in that the capacitor plates are slightly smaller on one side of the tag than the other.

Still another feature of the invention resides broadly in the tag, characterized in that the capacitor plates are provided with slits which reduce eddy current losses.

Yet still another feature of the invention resides broadly in the tag, wherein the slits in opposed capacitor plates are substantially perpendicular to each other.

Still another feature of the invention resides broadly in the antipilferage tag which includes a resonant circuit adapted to receive an RF signal and to transmit a response signal when interrogated by the RF signal, characterized in that the tag includes deactivating means in the form of a circuit component constituted by or fabricated from a metallized layer less than 1 micron thick supported by a dielectric material.

Yet still another feature of the present invention resides broadly in the tag, characterized in that the deactivating means is a narrow region of the metallized film which constitutes a fusible link.

Still another feature of the present invention resides broadly in the tag, characterized in that the fusible link is capable of being fused, thereby going into open circuit, when subjected to a sufficiently high level of RF field swept through the resonant frequency of the circuit.

Yet still another feature of the present invention resides broadly in the tag, characterized in that the fusible link is constituted by a conductive path between one of the capacitor plates of the inner capacitor and the adjacent capacitor plate of the outer capacitor.

Still another feature of the present invention resides broadly in the tag, characterized in that the tag is formed by bonding together two laminar components, the first being an aluminum/polyester laminate the aluminum of which has been etched into coils; and the second being a polypropylene layer onto which has been deposited thin, metallized strips.

Yet still another feature of the present invention resides broadly in the method of fabricating an antipilferage tag, which method comprises:

(a) bonding a metal layer to one surface of a laminar dielectric material;

(b) depositing a thin, metallized coating onto the opposite surface of the dielectric material; and (c) generating circuit components from the metal layer and from the thin, metallized coating;

characterized in that the thin, metallized coating is less than 1 micron thick.

Still another feature of the invention resides broadly in the method, characterized in that the thin, metallized coating is etched to generate the desired circuit geometry.

Some types of adhesives which could possibly be used in the present invention, or for producing the present invention are listed herebelow:

an elastomer-resin composition wherein the resin can be a hydrogenated ester and the elastomer can contain organic polyol and organic diisocyanate, as disclosed by U.S. Pat. No. 3,914,484 to Creegan and White, entitled "Pressure Sensitive Adhesive Labels and Method of Making"

a polythioether polymer containing liquid polyene compositions cured to polythiol elastomeric products, as disclosed by U.S. Pat. No. 3,920,877 to Barber et al., entitled "Fully-Cured Crosslinkable Pressure Sensitive Adhesive Materials and Method of Making Same"

a composition of acrylic acid ester or polyvinyl ether in combination with acrylic acid or a derivative of acrylic acid, a plasticizer and an emulsifier, as disclosed by U.S. Pat. No. 4,033,918 to Hauber, entitled "Water Removable Pressure Sensitive Adhesive"

a thermoplastic block polymer in combination with a tackifying resin and a low saturated oil as disclosed by U.S. Pat. No. 4,097,434 to Coker, entitled "Adhesive Composition"

an ABA-type monoalkenyl arene/conjugated diene block copolymer in combination with an AB two-block copolymer, a tackifying resin and a compounding oil, as disclosed by U.S. DEFPUB T00203 to Lauck, entitled "Label Adhesive"

a polymer of vinyl or vinylidene monoaromatic monomer with conjugated diene unsaturated acid and an alkyl ester of methacrylic acid, as disclosed by U.S. Pat. No. 4,438,232 to Lee, entitled "Carboxylated Acrylate Styrene Butadiene Adhesives"

an ester of acrylic acid with ethylenically unsaturated carboxylic acid; a conjugated diolefin with vinyl aromatic monomer and ethylenically unsaturated carboxylic acid; and monoolefin, vinyl ester and ethylenically unsaturated carboxylic acid, as disclosed by U.S. Pat. No. 4,540,739 to Midgley, entitled "Adhesive Polymer Latex"

an acrylic copolymer component, such as an acetoacetyl group-containing acrylic copolymer, and a curing components such as an isocyanate or epoxy, as disclosed by U.S. Pat. No. 4,987,186 to Akiyama et al., entitled "Pressure Sensitive Adhesive Composition"

a polymer of an acrylic ester of a saturated alcohol, with a surfactant and dextrin, as disclosed by U.S. Pat. No. 5,004,768 to Mahil and Cruden, entitled Adhesive Composition and Self-Adhesive Sheet Material"

Some additional types of adhesives which could possibly be used in the present invention, or for producing the present invention, may be disclosed in the following patents: U.S. Pat. No. 5,185,690 to Miller on Feb. 9, 1993, entitled "High-dielectric constant sheet material"; U.S. Pat. No. 5,161,093 to Gorcyzyca et al. on Nov. 3, 1992, entitled "Multiple Lamination High Density Interconnect Process and Structure Employing a Variable Crosslinking Adhesive"; and U.S. Pat. No. 5,206,074 to Davis et al. on Apr. 27, 1993, entitled "Adhesives on Polymide Films and Methods of Preparing Them".

The polymer dielectric preferably used in the present invention may typically comprise polymers such as polyester or polypropylene. Some examples of polyesters which may be able to be used in the present invention are poly (ethylene terepthalate) and poly(butylene terepthalate). Some examples of polypropylenes which may be able to be used in the present invention are isotactic polypropylene and Ziegler Process polypropylene.

An example of metallization Which could possible be used in the present invention may be disclosed in the following patent: U.S. Pat. No. 5,270,254 to Chen et al. on Dec. 14, 1993, entitled "Integrated Circuit Metallization with Zero Contact Enclosure Requirements and Method of Making the Same".

The preferably metallized layer used in the present invention may be formed by a conventional method such as sputtering, as discussed previously. An example of a method of sputtering which could possibly be used in the present invention, may be disclosed in the following patent: U.S. Pat. No. 5,249,728 to Lam on Oct. 5, 1993, entitled "Bumpless Bonding Process Having Multilayer Metallization".

Another conventional method by which the preferably metallized layer used in the present invention may be formed is electroplating, as discussed previously. An example of a method of electroplating which could possibly be used in the present invention, may be disclosed in the following patent: U.S. Pat. No. 5,262,042 to Okabayashi on Nov. 16, 1993, entitled "Simplified Method for Direct Electroplating of Dielectric Substrates".

Yet another conventional method by which the preferably metallized layer used in the present invention may be formed is chemical or vapor deposition, as discussed previously. An example of a method of chemical and vapor deposition which could possibly be used in the present invention, may be disclosed in the following patent: U.S. Pat. No. 5,266,355 to Wernberg et al. on Nov. 30, 1993, entitled "Chemical Vapor Deposition of Metal Oxide Films".

Still another conventional method by which the preferably metallized layer used in the present invention may be formed is evaporation, as discussed previously. An example of a method of evaporation and apparatus therefor which could possibly be used in the present invention, may be disclosed in the following patent: U.S. Pat. No. 5,269,898 to Welty on Dec. 14, 1993, entitled "Apparatus and Method for Coating a Substrate Using Vacuum Arc Evaporation".

Some examples of antipilferage devices may be disclosed in the following patents: U.S. Pat. No. 4,999,609 to Crossfield on Mar. 12, 1991, entitled "Antipilferage Tags Having an Acoustic Resonator Chamber"; and U.S. Pat. No. 4,541,559 to O'Brien on Sep. 17, 1985, entitled "Method of Making Electrical Connections Between Opposing Metal Foils Having a Flexible, Insulating Layer Sandwiched Therebetween."

When bonding the aluminum and polymer layer, glue bonding, or direct hot nip of the polymer to the aluminum may be possible, as discussed previously. An example of a hot nip method which could possibly be used in the present invention, may be disclosed in the following patent: U.S. Pat. No. 4,738,197 to Malkia on Apr. 19, 1988, entitled "Cooling of a Paper Web in a Supercalendar".

In order to preferably reduce overall resistivity, thicker metallization may preferably be deposited in areas other than the fusing zone, as discussed previously. This may be achieved by conventional means such as electrodeposition or electroless plating. An example of a method of electrodeposition which could possibly be used in the present invention, may be disclosed in the following patent: U.S. Pat. No. 5,256,274 to Poris on Oct. 26, 1993, entitled "Selective Metal Electrodeposition Process". An example of a method of electroless plating which could possibly be used in the present invention, may be disclosed in the following patent: U.S. Pat. No. 5,269,838 to Inoue on Dec. 14, 1993, entitled "Electroless Plating Solution and Plating Method With It".

In order to define the coil pattern preferably on the aluminum laminate, the aluminum laminate may be shot blasted preferably using a rubber compound resist preferably printed onto the foil, as discussed previously. An example of a method and apparatus used in shot blasting of this type may be disclosed in the following patent: U.S. Pat. No. 4,924,643 to Buiguez on May 15, 1990, entitled "Method and Apparatus for the Treatment of Work Pieces by Shot Blasting".

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign and international publication applications, namely, Great Britain Patent Application No. GB9114793, filed on Jul. 9, 1991, and PCT/GB92/01250, filed on Jul. 9, 1992, having inventor Andrew Dames, and published patent application having International Publication No. W093/01571, as well as any other of their published equivalents, and other equivalents or corresponding applications, if any, in corresponding cases in Great Britain and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby included by reference into this specification.

The invention as described hereinabove in the context of the preferred embodiments is not to be taken as limited to all of the provided details thereof, since modifications and variations thereof may be made without departing from the spirit and scope of the invention.

I claim:

1. A method of making a self-adhesive tag, the tag comprising: a first side and a second side; a first material disposed on the first side; a second material disposed on the second side; an intermediate supporting layer disposed between the first material and the second material; the intermediate layer having a first side disposed towards the first material and a second side disposed towards the second material; means for adhering the second material to the second side of the intermediate layer; an adhesive layer disposed on the second material, the adhesive layer being configured for bonding the tag to a product; release paper material disposed on the adhesive layer, the release paper material being configured for preventing adhesion of the adhesive layer to undesired surfaces; said method comprising the steps of:

providing the first material, the first material comprising metal;

providing the second material;

providing the intermediate layer;

configuring the intermediate layer to have a first side and a second side;

providing the adhering means;

providing the adhesive layer;

providing the release paper material;

said method further comprising the steps of:

applying the second material to the second side of the intermediate layer with the adhering means;

disposing portions of the first material in different amounts and at different times on the first side of the intermediate layer;

said step of disposing comprising providing a layer of the first material on the first side of the intermediate layer, the layer of the first material having a thickness less than 1 micron;

forming predetermined patterns in the first material and the second material;

coating the second material with the adhesive layer; and disposing the release paper on the adhesive layer.

2. The method according to claim 1 wherein:

said step of providing the second material comprises providing a metal layer having a thickness, the thickness of the metal layer being substantially greater than the thickness of the first material; and said step of providing the intermediate layer comprises providing dielectric material.

3. The method according to claim 1 wherein:

said step of providing the second material comprises providing a metal layer having a thickness, the thickness of the metal layer being greater than the thickness of the first material; and said step of providing the intermediate layer comprises providing dielectric material.

4. A tag made by the method of claim 1.

5. The method according to claim 2 wherein said step of forming comprises etching the first material to form a predetermined pattern, said predetermined pattern comprising a circuit.

6. The method according to claim 3 wherein said step of forming comprises etching the first material to form a predetermined pattern, said predetermined pattern comprising a circuit.

7. The method according to claim 5 wherein:

said step of providing the first material further comprises providing a copper layer; and said step of disposing comprising providing a layer of the first material on the first side of the intermediate layer, the layer of the first material having a thickness of about 0.1 micron.

8. The method according to claim 5 wherein said step of disposing comprises disposing the first material on the first side of the intermediate layer by one of the following methods c), d), e), f), and g):

c) evaporation;

d) sputtering;

e) chemical deposition;

f) vapor deposition; and g) electroplating.

9. The method according to claim 6 wherein said step of disposing comprises disposing the first material on the first side of the intermediate layer by one of the following methods c), d), e), f), and g):

c) evaporation;

d) sputtering;

e) chemical deposition;

f) vapor deposition; and g) electroplating.

10. The method according to claim 6 wherein said step of providing the first material comprises providing an aluminum layer.

11. The method according to claim 7 wherein said step of disposing comprises disposing the first material on the first side of the intermediate layer by one of the following methods c), d), e), f), and g):

c) evaporation;

d) sputtering;

e) chemical deposition;

f) vapor deposition; and g) electroplating.

12. A tag made by the method of claim 7.

13. The method according to claim 8 wherein said step of providing the first material comprises providing an aluminum layer.

14. A tag made by the method of claim 8.

15. The method according to claim 9 wherein:

said step of providing the first material further comprises providing a copper layer; and said step of disposing comprising providing a layer of the first material on the first side of the intermediate layer, the layer of the first material having a thickness of about 0.1 micron.

16. The method according to claim 10 wherein:

said step of disposing comprises providing a layer of the first material on the first side of the intermediate layer, the layer of the first material having a thickness of about 0.1 micron; and said step of disposing comprises disposing the first material on the first side of the intermediate layer by one of the following methods c), d), e), f), and c) evaporation;

d) sputtering;

e) chemical deposition;

f) vapor deposition; and g) electroplating.

17. The method according to claim 11 wherein said step of providing the adhesive layer comprises providing at least one of the following a) and b):

a) an elastomer-resin compound, the resin comprising a hydrogenated ester and the elastomer comprising organic polyol and organic diisocyanate; and b) a polythioether polymer, the polythioether polymer comprising liquid polyene compositions cured to polythiol elastomeric products.

18. The method according to claim 13 wherein said step of disposing comprises providing a layer of the first material on the first side of the intermediate layer, the layer of the first material having a thickness of about 0.1 micron.

19. The method according to claim 15 wherein said step of providing the adhesive layer comprises providing at least one of the following a) and b):

a) an ester of acrylic acid with ethylenically unsaturated carboxylic acid; and b) a conjugated diloefin with vinyl aromatic monomer and ethylenically unsaturated carboxylic acid.

20. A method of making a self-adhesive tag, said method comprising the steps of:

depositing portions of a first material on a first side of an intermediate layer, the first material comprising a metallized coating and the intermediate layer comprising a dielectric material;

said step of depositing comprising providing a layer of the first material on the first side of the intermediate layer, the layer of the first material having a thickness less than 1 micron;

fastening a second material to a second side of the intermediate layer, the second material comprising a metal layer, and the second side of the intermediate layer facing away from the first side of the intermediate layer;

forming predetermined patterns in the first material and the second material;

coating the second material with an adhesive layer; and disposing release paper on the adhesive layer.

21. The method according to claim 20 wherein said step of forming comprises etching the first material to form a predetermined pattern, said predetermined pattern comprising a circuit.

22. The method according to claim 21 wherein said step of depositing comprises depositing the first material on the first side of the intermediate layer by one of the following methods a), b), c), d), and e):

a) evaporation;

b) sputtering;

c) chemical deposition;

d) vapor deposition; and e) electroplating.

23. A tag made by the method of claim 20.

24. A tag made by the method of claim 22.

* * * * *

UNITED STATES PATENT AND TRADEMARK OFFICE

CERTIFICATE OF CORRECTION

PATENT NO. : 5,689,263

DATED : November 18, 1997

INVENTOR(S) : Andrew DAMES

It is certified that error appears in the above-identified patent and that said Letters Patent is hereby corrected as shown below:

On the title page, item [75], after 'Dames,', delete "Milton," and insert --Cambridge,--.

In column 11, line 58, Claim 16, after 'and' insert --g):--.

Signed and Sealed this

Twenty-fifth Day of August, 1998

Attest:

BRUCE LEHMAN

*Attesting Officer*

*Commissioner of Patents and Trademarks*